(12) United States Patent
Chaudhari et al.

(10) Patent No.: US 6,754,628 B1
(45) Date of Patent: Jun. 22, 2004

(54) SPEAKER RECOGNITION USING COHORT-SPECIFIC FEATURE TRANSFORMS

(75) Inventors: Upendra V. Chaudhari, Elmsford, NY (US); Stephane H. Maes, Danbury, CT (US); Jiri Navratil, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 09/592,838

(22) Filed: Jun. 13, 2000

(51) Int. Cl.$^7$ .............................................. G10L 17/00
(52) U.S. Cl. ...................... 704/246; 704/238; 704/269; 704/203
(58) Field of Search ................................ 704/246, 238, 704/269, 203, 270, 257, 243

(56) References Cited

U.S. PATENT DOCUMENTS

| | | | | | |
|---|---|---|---|---|---|
| 5,675,704 | A | * | 10/1997 | Juang | 704/246 |
| 5,897,616 | A | * | 4/1999 | Kanevsky | 704/246 |
| 5,930,748 | A | * | 7/1999 | Kleider | 704/219 |
| 6,006,184 | A | * | 12/1999 | Yamada | 704/246 |
| 6,356,868 | B1 | * | 3/2002 | Yuschick | 704/246 |
| 6,393,397 | B1 | * | 5/2002 | Choi | 704/250 |

OTHER PUBLICATIONS

Isobe, Toshihiro and Takahashi, Jun–ichi. "A New Cohort Normalization Using Local Acoustic Information for Speaker Verification." Acoustics, Speech, and Signal Processing, 1999. ICASSP '99. Proceedings., 1999 IEEE International Conference. on, vol.: 2.*

D.A. Reynolds, "Speaker identification and verification using Gaussian mixture speaker models", Speech Communication 17 (1995), pp. 91–108.

R. Gopinath, "Maximum Likelihood Modeling with Gaussian Distributions for classification", Proceedings of the International Conference on Acoustics, Speech, and Signal Processing (ICASSP'98), Seattle 1998.

K. Fukunuga, "Statistical Pattern Recognition", Academic Press 1990.

* cited by examiner

Primary Examiner—Richemond Dorvil
Assistant Examiner—Kinari Patel
(74) Attorney, Agent, or Firm—Ference & Associates

(57) ABSTRACT

Methods and apparatus for facilitating speaker recognition, wherein, from target data that is provided relating to a target speaker and background data that is provided relating to at least one background speaker, a set of cohort data is selected from the background data that has at least one proximate characteristic with respect to the target data. The target data and the cohort data are then combined in a manner to produce at least one new cohort model for use in subsequent speaker verification. Similar methods and apparatus are contemplated for non-voice-based applications, such as verification through fingerprints.

22 Claims, 1 Drawing Sheet

SPEAKER RECOGNITION USING COHORT-SPECIFIC FEATURE TRANSFORMS

FIELD OF THE INVENTION

The present invention generally relates to apparatus and methods for providing speaker recognition.

BACKGROUND OF THE INVENTION

Voice-based speaker recognition (or verification) is an important component of personal authentication systems that are employed in controlling access to devices and services. For example, in telephone banking, an individual may provide a claim (e.g., his or her name) either by using the telephone keypad or by saying it. Subsequently, an automated system may either prompt the user to issue an utterance (password, answer to a question, etc.). The utterance can be analyzed and compared to the voice-print of the claimed person previously stored in a database. As a result of this comparison, the speaker could be either accepted or rejected. Other possible applications of voice-based speaker verification include, for example: computer access; database access via computer, cellphone or regular telephone; ATM access; and credit card authorization via telephone.

Typically, in voice-based speaker verification, a sample of the voice properties of a target speaker is taken and a corresponding model (i.e., a voiceprint) is built. In order to improve the system robustness against impostors, it is also usually the case that a large number of non-target speakers ("background speakers") are analyzed, pre-stored as voiceprint models, and then used to normalize the voiceprint likelihood scores of a target speaker. The discriminative power of the voiceprint models is crucial to the performance of the overall verification system. An example of a conventional arrangement may be found in D. A. Reynolds, "Speaker identification and verification using Gaussian mixture speaker models," Speech Communication 17 (1995), pp. 91–108.

A need has been recognized, however, in connection with providing voice-based speaker verification that displays even greater system robustness in the face of impostors than has hitherto been the norm.

SUMMARY OF THE INVENTION

In accordance with at least one presently preferred embodiment of the present invention, a "cohort selection" technique is employed in a different manner. Conventionally, cohort selection techniques involve the comparison of the target speaker's data to voice-prints of its closest background neighbors (cohorts) and to use this information for normalization purposes. In accordance with at least one preferred embodiment of the present invention, however, once the closest voice-prints are selected into a cohort set, the dissimilarity of the cohort models is increased using linear feature transforms. The transforms may be derived either from data relating to the target speaker only or from data relating to all speakers in the cohort, including the target speaker. A combination of these two alternatives is also contemplated herein.

The process contemplated herein are believed to contribute to improving the distinction power of the above-mentioned models by employing linear feature transforms derived from specific target speaker data and/or from the specific target's cohort speakers. The inventive processes may be used in a wide range of applications supporting voiceprint based authentication (e.g., as described in U.S. Pat. No. 5,897,616 to Kanevsky et al., entitled "Apparatus and Methods for Speaker Verification/Identification/Classification Employing Non-Acoustic and/or Acoustic Models and Databases).

In one aspect, the present invention provides a method of facilitating speaker verification, the method comprising the steps of providing target data relating to a target speaker; providing background data relating to at least one background speaker; selecting from the background data a set of cohort data having at least one proximate characteristic with respect to the target data; and combining the target data and the cohort data to produce at least one new cohort model for use in subsequent speaker verification.

In another aspect, the present invention provides an apparatus for facilitating speaker verification, the apparatus comprising: a target data store which supplies data relating to a target speaker; a background data store which supplies data relating to at least one background speaker; a selector which selects from the background data a set of cohort data having at least one proximate characteristic with respect to the target data; and a modeller which combines the target data and the cohort data to produce at least one new cohort model for use in subsequent speaker verification.

In an additional aspect, the present invention provides a program storage device readable by machine, tangibly embodying a program of instructions executable by the machine to perform method steps for facilitating speaker verification, the method comprising the steps of: providing target data relating to a target speaker; providing background data relating to at least one background speaker; selecting from the background data a set of cohort data having at least one proximate characteristic with respect to the target data; and combining the target data and the cohort data to produce at least one new cohort model for use in subsequent speaker verification.

In a further aspect, the present invention provides a method of facilitating verification, the method comprising the steps of providing target data relating to a target individual; providing background data relating to at least one background individual; selecting from the background data a set of cohort data having at least one proximate characteristic with respect to the target data; and combining the target data and the cohort data to produce at least one new cohort model for use in subsequent verification.

In another aspect, the present invention provides an apparatus for facilitating verification, the apparatus comprising: a target data store which supplies data relating to a target individual; a background data store which supplies data relating to at least one background individual; a selector which selects from the background data a set of cohort data having at least one proximate characteristic with respect to the target data; and a modeller which combines the target data and the cohort data to produce at least one new cohort model for use in subsequent verification.

Furthermore, the present invention provides in another aspect a program storage device readable by machine, tangibly embodying a program of instructions executable by the machine to perform method steps for facilitating verification, the method comprising the steps of: providing target data relating to a target individual; providing background data relating to at least one background individual, selecting from the background data a set of cohort data having at least one proximate characteristic with respect to the target data; and combining the target data and the cohort data to produce at least one new cohort model for use in subsequent verification.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

Figure 1:
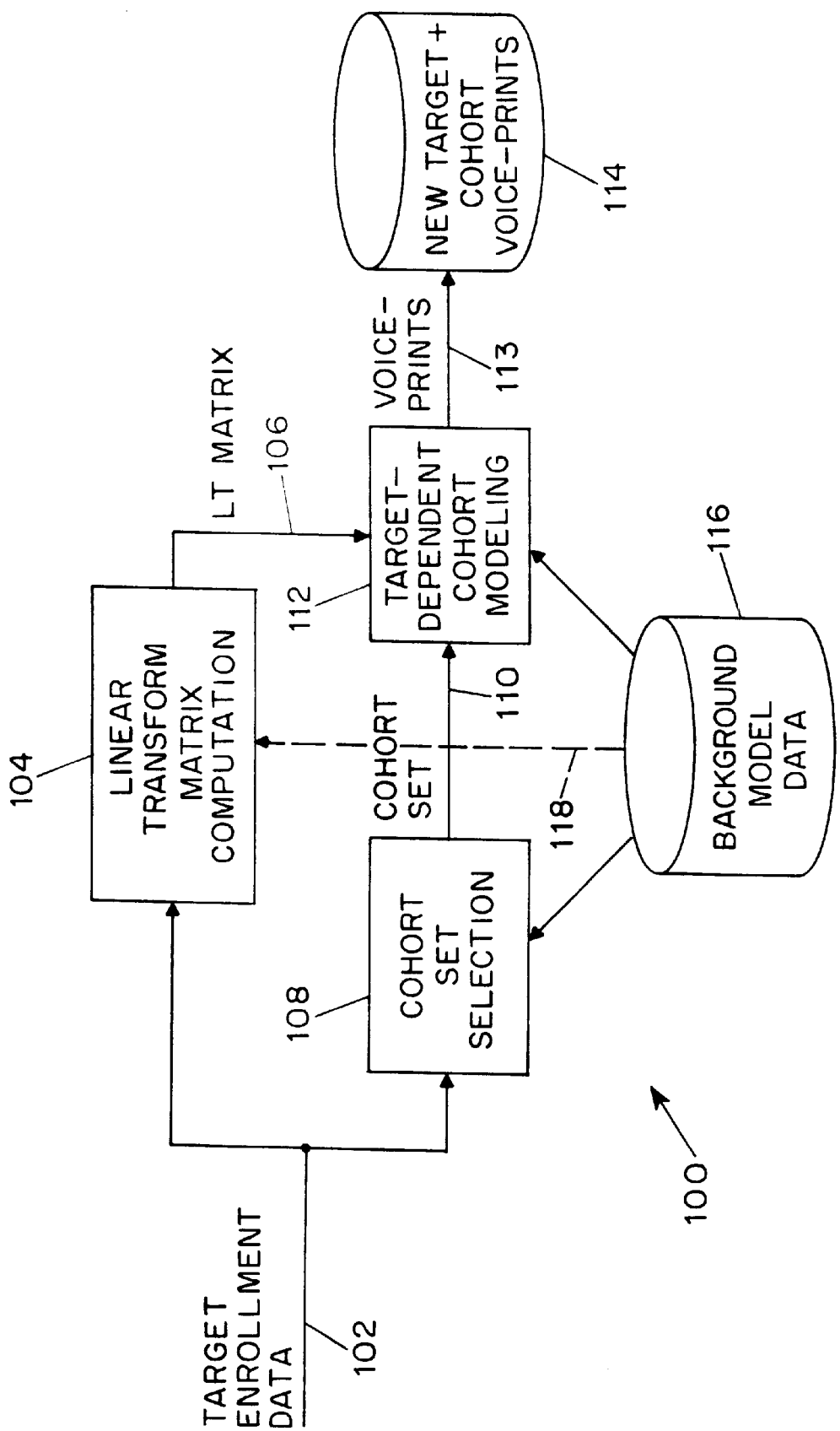
FIG. 1 schematically illustrates enrollment architecture that may be employed in accordance with at least one preferred embodiment of the present invention.

The disclosure now turns to a discussion of processes and apparatus in accordance with at least one presently preferred embodiment of the present invention and, where necessary, makes reference to accompanying FIG. 1.

One embodiment of the present invention broadly contemplates developing a linear transform derived solely from a target speaker. In this connection, the linear transform will preferably be obtained from the target-speaker data and then be applied to the complete cohort feature space. In a preferred embodiment of the present invention, a linear feature space transform may be employed that is based on a maximum likelihood criterion for diagonalized Gaussian models, such as disclosed in R. Gopinath, "Maximum Likelihood Modeling with Gaussian Distributions for Classification," (Proceedings of the International Conference on Acoustics, Speech, and Signal Processing [ICASSP'98], Seattle 1998).

A representative example of an enrollment procedure 100 for a given target speaker and a number of background (BG) models is as follows:

a) estimate the target model (voice-print) using enrollment data 102 in the original feature space;

b) at step 108, determine the subset 110 of C background (BG) speaker models 116 that are closest to the created voice-print (and thus form a "cohort set") in the original feature space by way of an appropriate distance (or likelihood) measure between the target and the BG models.

c) at step 104, estimate the maximum likelihood linear transform (MLLT) matrix 106 for the created target voice-print, preferably as described in Gopinath, supra;

d) at step 112, create a set of C new cohort models 113 in the feature space transformed using the MLLT matrix 106 calculated in c)(step 104); these models will preferably be retained at 114 at an appropriate storage location and then subsequently used for normalizing the target scores during verification, e.g., in a log-likelihood ratio test as described in the copending and commonly assigned U.S. patent applications to U. Chaudhari et al., entitled "Speaker Recognition Method Based on Structured Speaker Modeling and a 'Pick-max' Scoring Technique", and to U. Chaudhari et al., entitled "Weight Based Background Discriminant Functions in Authentication Systems", both filed herewith.

For step a) described above, the process of estimating target model M preferably involves the determination of parameters of the model, wherein the model may be statistical in nature (e.g., it may be a statistical model such as Gaussian mixture models). The parameters could be the means, the variances and the covariances for all dimensions, whereby the dimensionality is determined by the number of features in the feature vector. All such parameters can be easily estimated using well-known formulae for biased or unbiased estimators (see, for example, Fukunaga, K., "Statistical Pattern Recognition," [Academic Press 1990]).

For step b) described above, when determining the closest background models 110 at 108, a likelihood measure calculated on the data used in step a), e.g. accumulated Gaussian densities for each of these models, may be employed.

For step c) described above, the MLLT matrix 106 may preferably be the result of a non-linear iterative optimization process, e.g. achieved by the well-known gradient-descent method, whose objective function is a minimization of the loss of the probability mass incurred by the diagonal-covariance assumption that is imposed to the model structure.

For step d) described above, the training feature vectors used in step a) may now be transformed using the MLLT matrix 106. Since this is a linear transform, the transformation is preferably achieved by a matrix-vector multiplication resulting in a new set of feature vectors.

It should be noted that the algorithm outlined above in steps a) through d) is not restricted to using only the MLLT. Essentially any linear transform that is obtained from the target speaker data via an algorithm that optimizes the resulting target voice-print according to certain well-defined criteria may be employed.

Alternatively, the cohort set (step b) may be determined in the new (transformed) feature space by re-creating the models for the complete BG population and selecting C such models that are closest to M. This alternative, however, would appear to involve more computation.

Another embodiment of the present invention broadly contemplates developing a cohort-wide feature transform (which includes target speaker data). Here, the complete feature space delimited by the cohort set is taken into account. In a preferred embodiment of the present invention, a linear discriminative analysis (LDA), such as that described in Fukunaga, supra, is applied in such a way that the feature space coordinates are rotated so as to best distinguish the target model from the cohort models. In the context of the present invention, the LDA will thus preferably solve a two-class problem, whereby one class is represented by the target model and the second class is represented by all cohort models for the particular target in question.

An example of an enrollment algorithm in this connection might thus appear as follows:

a') estimate the target voice-print M using the enrollment data 102 in the original feature space;

b') at 108, determine the subset 110 of C background speaker models 116 that are closest to the created voice-print (cohort set) in the original feature space by means of an appropriate distance (or likelihood) measure between the target and the BG models;

c') at step 104, estimate the LDA matrix 106 for the created target voice-print and (as indicated by the dotted path 118) the cohort models, for instance, as described in Fukunaga, supra; here, the target model may preferably be treated as a separate class and the cohort models may be treated either as belonging to one common class or as a set of individual classes, each corresponding to a particular cohort model.

d') at step 112, use the LDA matrix 106 from c') (step 104) to transform the feature space for the given target and its cohorts and re-create all models (i.e. the target voice-print and its cohort models) in this feature space;

the re-created models 113 will preferably retained at an appropriate storage location (114) and will then subsequently be used for normalizing the target scores during verification, e.g., in a log-likelihood ratio test such as described in the two patent applications to Chaudhari et al., supra.

Preferably, steps a') and b') may be carried out similarly to the steps a) and b) described further above.

For step c'), the LDA matrix may preferably be obtained by using a closed-solution of a generalized eigenvalue problem:

$$W^{-1}Bx=x\lambda$$

where $W^{-1}$ is the inverted within-covariance matrix, B is the between-covariance matrix, x is a training vector matrix and $\lambda$ is the vector with constants (eigenvalues).

The solution of the above equation will be m eigenvectors corresponding to the m eigenvalues, and the eigenvectors will represent orthogonal bases for the new transformed feature space. The between-covariance matrix reflects the average scatter of the means of the individual speakers (target and background) around a global mean vector of all the models, while the within-covariance matrix reflects the average covariance of the feature vectors within the their corresponding model space. The eigenvalue solution maximizes the ratio of between/within covariance matrices. A detailed discussion of the properties of the LDA can be found in Fukunaga, supra.

Step d') will preferably be carried out similarly to the step d) outlined further above. Since the LDA 106 is also a linear transform, the training feature vectors are multiplied by this matrix resulting in a new feature vectors. Those new vectors will preferably serve as a basis for training the new models in a similar way as described in step a) further above.

By applying the feature transform on the cohort set for a particular target, discriminancy is improved, and by extension the robustness of the verification scores. As opposed to standard techniques employing the LDA on the complete feature space including all models, the method described above is found to achieve significant improvement by focusing on a single target model and re-creating its "private" cohort set.

It will now also be appreciated that the two previously described approaches may be algorithmically combined in the following ways:

a") the cohort-wide transform can be obtained as in steps a) through d) and can be followed by a target-dependent transform as suggested in steps a') through d'); or b") steps a') through d') can be followed by a linear transform, e.g. the MLLT, obtained specifically for each of the determinative models (i.e., for the target as well as for each of the cohorts) in a manner similar to that described in copending and commonly assigned U.S. patent application to U. Chaudhari et al., entitled "Method and Apparatus for Performing Pattern-Specific Maximum Likelihood Transformations for Speaker Recognition".

All three of the techniques described above (i.e., target-only, target plus cohort, and the "hybrid" approach) can be applied on any level of phonetic structuring, e.g., phones, syllables, phone classes, or global, unstructured speech segment models. Assuming a well-defined distance (or likelihood measure) for determining the cohort set in step b/b') for speaker models with multiple levels of phonetic detail (structured models), building the transformation matrices in step c/c') can then preferably be carried out on each level of phonetic detail independently.

If the transformation matrices are so built, then step d/d') will still be carried out as contemplated hereinabove. Particularly, the transformation matrices, created independently, will then preferably each be applied independently and will impact only on the score (during test—verification) of the corresponding models. These scores may then preferably be used the same way as scores without the transforms, e.g., in a manner similar to that described in the patent application to U. Chaudhari et al., entitled "Speaker Recognition Method Based on Structured Speaker Modeling and a 'Pickmax' Scoring Technique", supra.

In brief recapitulation, it will be appreciated that a significant advantage of the inventive approaches contemplated herein, as compared with the conventional process of score normalization using a global background population, is that the cohort models are rebuilt for each particular target in a new feature space specifically transformed for this target, thus achieving greater robustness of the associated speaker verification system against impostors.

It is to be understood that the methods and arrangements described and contemplated herein can be applied to biometric tasks other than speech recognition and other generic acceptance/rejection pattern matching problems. For instance, the inventive methods and arrangements may be applied to fingerprint verification or other types of verification that do not require the use of a voice.

It is to be understood that the present invention, in accordance with at least one presently preferred embodiment, includes a target data store, a background data store, a selector which selects from the background data a set of cohort data and a modeller which combines the target data and the cohort data to produce at least one new cohort model. Together, the target data store, background data store, selector and modeller may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of facilitating speaker verification, said method comprising the steps of:

providing target data relating to a target speaker;

providing background data relating to at least one background speaker;

selecting from the background data a set of cohort data having at least one proximate characteristic with respect to the target data; and combining the target data and the cohort data to produce at least one new cohort model for use in subsequent speaker verification;

transforming the target data prior to said combining step;

said combining step comprising combining the transformed target data and the cohort data to produce at least one new cohort model for use in subsequent speaker verification.

2. The method according to claim 1, wherein said transforming step comprises determining a linear transform matrix that includes the transformed target data.

3. A method of facilitating speaker verification, said method comprising the steps of:
providing target data relating to a target speaker;
providing background data relating to at least one background speaker;
selecting from the background data a set of cohort data having at least one proximate characteristic with respect to the target data;
combining the target data and the cohort data to produce at least one new cohort model for use in subsequent speaker verification;
transforming the target data prior to said combining step and employing the cohort data in said transforming;
said combining step comprising combining the cohort data from said selecting step with the transformed target data to produce at least one new cohort model for use in subsequent speaker verification.

4. The method according to claim 3, wherein said transforming step comprises performing linear discriminant analysis on the target data and the cohort data.

5. The method according to claim 3, further comprising the steps of:
transforming solely the target data; and
combining the solely-transformed target data and the cohort data to produce at least one new cohort model for use in subsequent speaker verification.

6. The method according to claim 5, wherein said step of transforming solely the target data comprises determining a linear transform matrix that includes the transformed target data.

7. The method according to claim 3, further comprising the steps of:
transforming solely the target data;
separately transforming data relating to each background speaker that is associated with the cohort set; and
combining the solely-transformed target data and the transformed data relating to each separate background speaker associated with the cohort set to produce at least one new cohort model for use in subsequent speaker verification.

8. The method according to claim 7, wherein said steps of transforming solely the target data and separately transforming data relating to each background speaker associated with the cohort data each comprise determining a linear transform matrix.

9. The method according to claim 3, wherein said selecting step comprises determining at least one likelihood measure relating to the target data and the background data.

10. An apparatus for facilitating speaker verification, said apparatus comprising:
a target data store which supplies data relating to a target speaker;
a background data store which supplies data relating to at least one background speaker;
a selector which selects from the background data a set of cohort data having at least one proximate characteristic with respect to the target data; and
a modeller which combines the target data and the cohort data to produce at least one new cohort model for use in subsequent speaker verification;
a transforming arrangement which transforms the target data prior to its being combined with the cohort data in said modeller;
said modeller being adapted to combine the transformed target data and the cohort data to produce at least one new cohort model for use in subsequent speaker verification.

11. The apparatus according to claim 10, wherein said transforming arrangement is adapted to determine a linear transform matrix that includes the transformed target data.

12. An apparatus for facilitating speaker verification, said apparatus comprising:
a target data store which supplies data relating to a target speaker;
a background data store which supplies data relating to at least one background speaker;
a selector which selects from the background data a set of cohort data having at least one proximate characteristic with respect to the target data;
a modeller which combines the target data and the cohort data to produce at least one new cohort model for use in subsequent speaker verification;
a transforming arrangement which transforms the target data prior to its being combined with the cohort data in said modeller and which employs the cohort data when the target data is transformed;
said modeller being adapted to combine the cohort data from said selector with the transformed target data to produce at least one new cohort model for use in subsequent speaker verification.

13. The apparatus according to claim 12, wherein said transforming arrangement is adapted to perform linear discriminant analysis on the target data and the cohort data.

14. The apparatus according to claim 12, further comprising:
a second transforming arrangement which transforms solely the target data; and
a second modeller which combines the solely-transformed target data and the cohort data to produce at least one new cohort model for use in subsequent speaker verification.

15. The apparatus according to claim 14, wherein second transforming arrangement is adapted to determine a linear transform matrix that includes the transformed target data.

16. The apparatus according to claim 12, further comprising:
a second transforming arrangement which:
transforms solely the target data; and
separately transforms data relating to each background speaker that is associated with the cohort set; and
a second modeller which combines the solely-transformed target data and the transformed data relating to each separate background speaker associated with the cohort set to produce at least one new cohort model for use in subsequent speaker verification.

17. The apparatus according to claim 16, wherein said second transforming arrangement is adapted to determine separate linear transform matrices relating to solely the target data and relating to each background speaker associated with the cohort set.

18. The apparatus according to claim 12, wherein said selector is adapted to determine at least one likelihood measure relating to the target data and the background data.

19. A program storage device readable by machine, tangibly embodying a program of instructions executable by the machine to perform method steps for facilitating speaker verification, said method comprising the steps of:

providing target data relating to a target speaker;

providing background data relating to at least one background speaker;

selecting from the background data a set of cohort data having at least one proximate characteristic with respect to the target data; and combining the target data and the cohort data to produce at least one new cohort model for use in subsequent speaker verification;

transforming the target data prior to said combining step;

said combining step comprising combining the transformed target data and the cohort data to produce at least one new cohort model for use in subsequent speaker verification.

20. A method of facilitating verification, said method comprising the steps of:

providing target data relating to a target individual;

providing background data relating to at least one background individual;

selecting from the background data a set of cohort data having at least one proximate characteristic with respect to the target data; and combining the target data and the cohort data to produce at least one new cohort model for use in subsequent verification;

transforming the target data prior to said combining step and employing the cohort data in said transforming;

said combining step comprising combining the cohort data from said selecting step with the transformed target data to produce at least one new cohort model for use in subsequent verification.

21. An apparatus for facilitating verification, said apparatus comprising:

a target data store which supplies data relating to a target individual;

a background data store which supplies data relating to at least one background individual;

a selector which selects from the background data a set of cohort data having at least one proximate characteristic with respect to the target data; and a modeller which combines the target data and the cohort data to produce at least one new cohort model for use in subsequent verification;

a transforming arrangement which transforms the target data prior to its being combined with the cohort data in said modeller and which employs the cohort data when the target data is transformed;

said modeller being adapted to combine the cohort data from said selector with the transformed target data to produce at least one new cohort model for use in subsequent speaker verification.

22. A program storage device readable by machine, tangibly embodying a program of instructions executable by the machine to perform method steps for facilitating verification, said method comprising the steps of:

providing target data relating to a target individual;

providing background data relating to at least one background individual;

selecting from the background data a set of cohort data having at least one proximate characteristic with respect to the target data; and combining the target data and the cohort data to produce at least one new cohort model for use in subsequent verification;

transforming the target data prior to said combining step and employing the cohort data in said transforming;

said combining step comprising combining the cohort data from said selecting step with the transformed target data to produce at least one new cohort model for use in subsequent verification.

* * * * *